US009272639B2

United States Patent
Lee et al.

(10) Patent No.: US 9,272,639 B2
(45) Date of Patent: Mar. 1, 2016

(54) LOCKING DEVICE OF SEAT RAIL OF VEHICLE

(75) Inventors: Jae Gab Lee, Gyeongju-si (KR); Jae Chul Jung, Gyeongju-si (KR)

(73) Assignee: Das Co., Ltd., Gyeongju-si (KR)

( * ) Notice: Subject to any disclaimer, the term of this patent is extended or adjusted under 35 U.S.C. 154(b) by 187 days.

(21) Appl. No.: 13/443,527

(22) Filed: Apr. 10, 2012

(65) Prior Publication Data

US 2012/0294674 A1 Nov. 22, 2012

(30) Foreign Application Priority Data

May 17, 2011 (KR) .................. 10-2011-0046313

(51) Int. Cl.
*B60N 2/07* (2006.01)
*F16B 7/10* (2006.01)
*B60N 2/08* (2006.01)

(52) U.S. Cl.
CPC ............ *B60N 2/0705* (2013.01); *B60N 2/0715* (2013.01); *B60N 2/0818* (2013.01); *B60N 2/0875* (2013.01); *B60N 2/0893* (2013.01); *Y10T 403/595* (2015.01); *Y10T 403/7081* (2015.01)

(58) Field of Classification Search
USPC .......... 403/109.1, 109.2, 109.3, 109.6, 109.8, 403/322.4, 378, 379.1; 297/340, 344.1; 296/65.13, 65.14, 65.15; 248/424, 429
See application file for complete search history.

(56) References Cited

U.S. PATENT DOCUMENTS

| 7,207,541 | B2 * | 4/2007 | Frohnhaus et al. | 248/429 |
| 8,029,063 | B2 * | 10/2011 | Kazyak et al. | 248/429 |
| 8,382,057 | B2 * | 2/2013 | Napau et al. | 248/429 |
| 8,387,936 | B2 * | 3/2013 | Tarusawa et al. | 248/429 |
| 2009/0114793 | A1 * | 5/2009 | Brewer et al. | 248/429 |
| 2010/0327139 | A1 * | 12/2010 | Wojatzki et al. | 248/429 |

FOREIGN PATENT DOCUMENTS

| KR | 100513577 | 8/2004 |
| KR | 100916395 | 5/2007 |
| KR | 10200901096 | 3/2014 |
| WO | WO9517317 | 6/1995 |

\* cited by examiner

*Primary Examiner* — Josh Skroupa
(74) *Attorney, Agent, or Firm* — Nixon Peabody LLP (57) ABSTRACT

A vehicle seat rail locking device restricts movement of an upper rail along a longitudinal direction of a lower rail fixed to the body of the vehicle. The locking device includes lock units moving together with the upper rail, disposed movably in a vertical direction between the lower and upper rails, and for performing a locking operation, and a lock guide moving together with the lock units and for guiding vertical movement of the lock units. Each lock unit is independently inserted into one of a plurality of lock holes formed in the lower rail to fix the upper rail onto the lower rail. A user's safety may be improved by independently forming a plurality of lock members fitted into lock holes of a lower rail and fixing one of lock members into the lock hole to perform a locking operation even when a seat rail position deviation occurs.

4 Claims, 6 Drawing Sheets

LOCKING DEVICE OF SEAT RAIL OF VEHICLE

CROSS REFERENCE TO RELATED APPLICATIONS

This application claims priority from Korean Patent Application No. 10-2011-0046313, filed on May 17, 2011 in the Korean Intellectual Property Office, the disclosure of which is hereby incorporated herein by reference in its entirety.

BACKGROUND OF THE INVENTION

A. Technical Field

The present invention relates to a locking device of a seat rail of a vehicle, and more particularly, to a locking device of a seat rail of a vehicle, capable of allowing a user to adjust a forward-and-backward position of a seat appropriately for the body of the user by restricting movement of an upper rail moving forward and backward and combined onto a lower rail fixed to a body of the vehicle.

B. Background Art

In general, a seat of a vehicle is to maintain a user in an optimal riding pose, and includes a seat back for supporting an upper body of the user, and a seat cushion for supporting a lower body of the user, e.g., hips and thighs.

A seat of a vehicle may slide in forward and backward directions of the vehicle within a certain range in order to adjust the seat appropriately for the body of a user and to efficiently utilize an internal space of the vehicle, and a seat rail allows the seat to slide.

A seat rail generally includes a lower rail fixed onto a bottom surface of a vehicle, i.e., a floor panel, in a longitudinal direction of a body of the vehicle, and an upper rail slidably combined with the lower rail and fixed to a seat cushion.

The upper rail moves along the lower rail by a certain distance and then is temporarily fixed to the lower rail. In more detail, the seat rail further includes a locking device for temporarily fixing the upper rail that moves on the lower rail.

Accordingly, when the locking device is released, since the upper rail may slide along the lower rail and thus a seat of a vehicle may move in forward and backward directions of a body of the vehicle by a certain distance, an internal space of the vehicle may be efficiently utilized or a comfortable ride of a user may be maintained.

Figure 1:
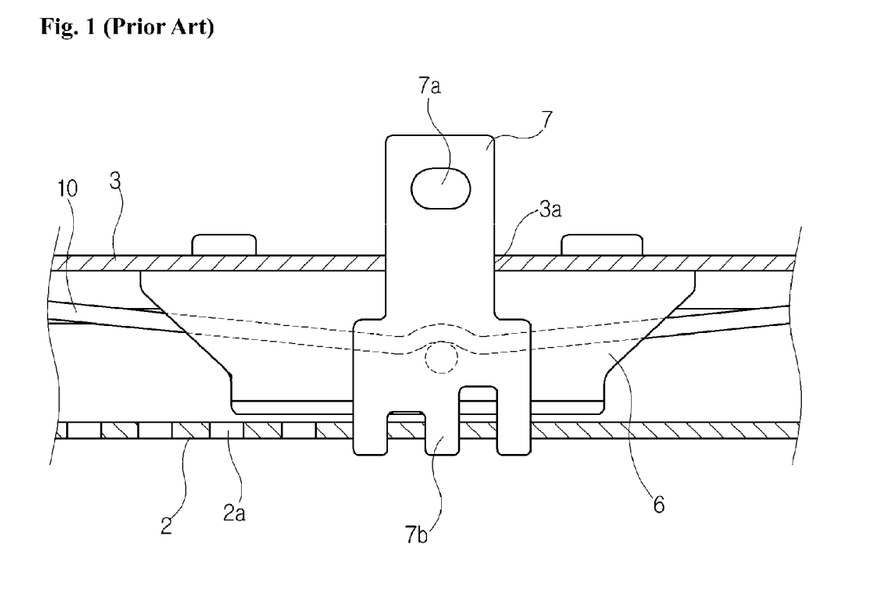
FIG. 1 is a cross-sectional view of a conventional locking device of a seat rail of a vehicle.

A conventional locking device of a seat rail includes a lock guide 6 fixed onto a lower surface of an upper rail 3, a lock 7 disposed between the lock, guide 6 and the upper rail 3, lock holes 2a formed in the lower rail 2 at equal intervals along a longitudinal direction of the lower rail 2, and a lock spring 10 for pressing the lock 7 to be engaged with the lock holes 2a of the lower rail 2.

A connection hole 7a is formed in an upper portion of the lock 7 and to be connected to an actuation lever protruding in a forward direction of the seat rail, and the lock 7 protrudes through an entrance hole 3a formed in an upper surface of the upper rail 3.

A plurality of lock bumps 7b are formed under the lock 7 and are inserted into the lock holes 2a formed in the lower rail 2.

In the above-described conventional locking device, two sets of seat rails each including the lower and upper rails 2 and 3 are fixed to a lower surface of a seat cushion at two sides. Due to an assembly variation generated when seat rails are assembled onto a bottom surface of a vehicle, a position deviation occurs between the lower and upper rails 2 and 3. If the lock bumps 7b are formed integrally with the lock 7, only one of two seat rails is rocked, the other of the seat rails is unlocked, and thus a user's safety may not be ensured.

Also, in the conventional locking device, since inclined surfaces of the lock bumps 7b inserted into the lock holes 2a simultaneously contact the lock holes 2a, noise may be generated due to minute vibration caused while the lock bumps 7b move upwardly to release a locked state.

BRIEF SUMMARY OF THE INVENTION

In at least aspect of the present concepts, there is provided a locking device of a seat rail of a vehicle for restricting movement of an upper rail combined onto a lower rail fixed to a body of the vehicle movably forward and backward in a longitudinal direction of the lower rail. The locking device includes a plurality of lock units moving together with the upper rail, disposed movably in a vertical direction between the lower and upper rails, and for performing a locking operation and a lock guide moving together with the lock units and for guiding vertical movement of the lock units. Each of the lock units is independently inserted into a plurality of lock, holes formed in the lower rail so as to fix the upper rail onto the lower rail.

Additional aspects of the invention will be apparent to those of ordinary skill in the art in view of the detailed description of various embodiments, which is made with reference to the drawings, a brief description of which is provided below.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

A. Technical Problem

The present invention provides a locking device of a seat rail of a vehicle, capable of improving the reliability of a user's safety by independently forming a plurality of lock units including a plurality of lock members inserted into lock holes of a lower rail, and thus allowing the lock members of at least one of the lock units to be inserted into the lock holes even when a position deviation occurs between two sets of seat rails.

Also, the present invention also provides a locking device of a seat rail of a vehicle, capable of compensate clearances between lock members and lock holes, ensuring a high breaking strength of the lock device, and preventing noise from being generated in locking and unlocking operations of the locking device, by allowing each lock unit to include at least one pair of lock members and allowing cross sections of the lock members to face each other.

B. Technical Solution

According to an aspect of the present invention, there is provided a locking device of a seat rail of a vehicle, for restricting movement of an upper rail combined onto a lower rail fixed to a body of the vehicle movably forward and backward in a longitudinal direction of the lower rail, the locking device including a plurality of lock units moving together with the upper rail, disposed movably in a vertical direction between the lower and upper rails, and for performing a locking operation; and a lock guide moving together with the lock units and for guiding vertical movement of the lock units, wherein each of the lock units is independently inserted into a plurality of lock holes formed in the lower rail so as to fix the upper rail onto the lower rail.

The lock unit may include at least one pair of lock members passing through guide holes formed in the lock, guide, and inserted into the lock holes; a lock housing having one end into which the lock members are inserted and fixed, and another end on which at least one pair of protrusions passing through via holes formed in the upper rail and exposed externally are formed; and a lock spring disposed on an outer circumference of at least one of the protrusions and for pressing the lock unit downwardly.

The locking device may further include a lock lever for moving the lock units upwardly; a lever guide fixed to the upper rail and for rotatably supporting the lock lever; and a lever spring for applying a restoration force to the lock lever.

A hook to which the lock lever operates may be formed on at least one of the protrusions.

Each of the lock members may have a rectangular cross section including long and short sides, and the lock members may be disposed in such a way that the long sides of the cross sections cross each other.

Each of the lock members may include a pair of first side surfaces facing each other and a pair of second side surfaces facing each other, the first side surfaces may be formed as perpendicular surfaces, and the second side surfaces may be formed as tapered and inclined surfaces.

The lock members may be inserted into the lock holes in such a way that the perpendicular surfaces of one of the lock members contact the lock hole of the lower rail, and that the inclined surface of the other of the lock members contact the lock hole of the lower rail.

C. Advantageous Effects

According to the present invention, the reliability of a user's safety may be improved by independently forming a plurality of lock units including a plurality of lock members inserted into lock holes of a lower rail, and thus allowing the lock members of at least one of the lock units to be inserted into the lock holes to perform a locking operation even when a position deviation occurs between seat rail sets disposed at two sides of a seat rail.

Also, clearances between lock bumps and lock holes may be compensated, a high breaking strength of a lock device may be ensured, and noise may be prevented from being generated in locking and unlocking operations, by allowing a plurality of lock units each including at least one pair of lock members, a lock housing, and a lock spring to independently perform a locking operation, and allowing cross sections of the lock bumps to face each other.

D. Mode of the Invention

The present invention will now be described more fully with reference to the accompanying drawings, in which exemplary embodiments of the invention are shown.

The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art.

Unless defined differently, all terms used in the description including technical and scientific terms have the same meaning as generally understood by one of ordinary skill in the art. Terms as defined in a commonly used dictionary should be construed as having the same meaning as in an associated technical context, and unless defined in the description, the terms are not ideally or excessively construed as having formal meaning.

In the drawings, the thicknesses of layers and regions are exaggerated for clarity.

Figure 2:
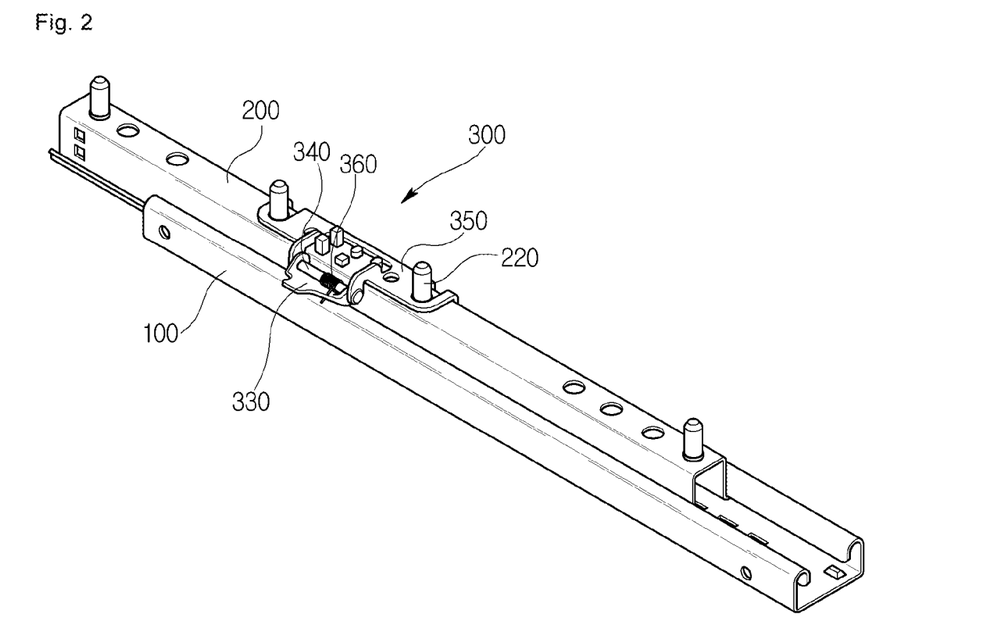
FIG. 2 is a perspective view of a seat rail of a vehicle and a locking device of the seat rail, according to an embodiment of the present invention.
Figure 3:
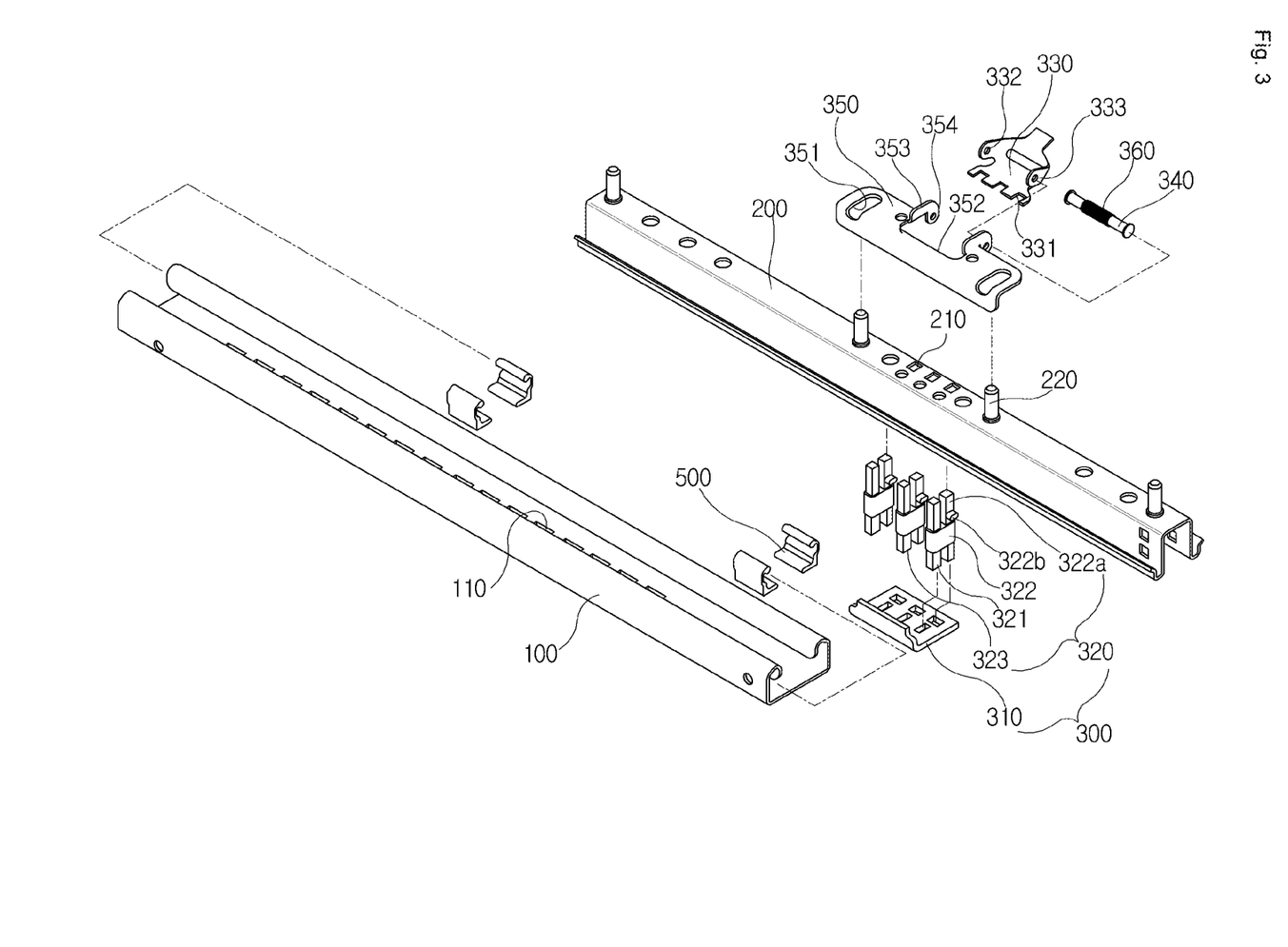
FIG. 3 is an exploded perspective view of the seat rail and the locking device illustrated in FIG. 2.

FIG. 2 is a perspective view of a seat rail of a vehicle and a locking device 300 of the seat rail, according to an embodiment of the present invention. FIG. 3 is an exploded perspective view of the seat rail and the locking device 300 illustrated in FIG. 2. The configuration of the locking device 300 will now be described with reference to FIGS. 2 and 3.

The locking device 300 is disposed movably in a vertical direction between a lower rail 100 and an upper rail 200, locks and unlocks the upper rail 200 used to fix a seat when a user manipulates a lever, and includes a lock guide 310, a plurality of lock units 320, a lock lever 330, a lever pin 340, a lever guide 350, and a lever spring 360.

The lower rail 100 has two ends fixed by fixing brackets onto a bottom surface of a body of the vehicle with a gap to a certain height, and has an almost ∪-shaped cross section.

The upper rail 200 is combined onto the lower rail 100 slidably forward and backward, is fixed to a seat cushion thereon so as to move the seat forward and backward in a driving direction of the vehicle, and has an almost ∩-shaped cross section.

The lock guide 310 is disposed between the upper and lower rails 200 and 100, and moves together with and guides vertical movement of the lock units 320. A plurality of guide holes through which lock members 321 formed at lower portions of the lock units 320 pass are formed in the lock guide 310.

The lock units 320 are spaced apart from each other, pass through the guide holes of the lock guide 310, and are individually inserted into a plurality of lock holes 110 formed in the lower rail 100. In more detail, each of the lock units 320 includes at least one pair of lock members 321 passing through the guide holes of the lock guide 310 and inserted into the lock holes 110 of the lower rail 100, a lock housing 322 having one end into which the lock members 321 are inserted and fixed, and another end on which at least one pair of protrusions 322a passing through via holes 210 formed in the upper rail 200 and exposed externally are formed, and a lock spring 323 disposed on an outer circumference of at least one of the protrusions 322a and pressing the lock unit 320 downwardly.

Although one lock unit 320 includes a pair of lock members 321 and a pair of protrusions 322a in FIG. 3, the current embodiment is not limited thereto and three or more lock members 321 and three or more protrusions 322a may be included in one lock unit 320. Hereinafter, for convenience' sake, it is assumed that one lock unit 320 includes a pair of lock members 321 and a pair of protrusions 322a.

The lock housing 322 has one end (particularly, a lower end) connected to a pair of lock members 321 so as to move together with the lock members 321 in a vertical direction when the seat rail is locked, and another end (particularly, an upper end) having a pair of protrusions 322a passing through the via holes 210 formed in the upper rail 200 and protruding upwardly from the upper rail 200.

The protrusions 322a of the lock housing 322 may have empty inner spaces. Thus, upper portions of the lock members 321 may be inserted into the protrusions 322a and lower portions of the lock members 321 may protrude downwardly from the lock housing 322.

A locking operation of the locking device 300 is realized by allowing the protrusions 322a of the lock housing 322 to pass through the via holes 210 of the upper rail 200 and to protrude upwardly from the upper rail 200, and allowing the lower portions of the lock members 321 inserted and fixed into the lower end of the lock housing 322 to pass through the guide holes of the lock guide 310 and to be inserted into the lock holes 110 of the lower rail 100.

The lock spring 323 is used to press the lock unit 320 lifted by the lock lever 330 downwardly to a locked state, and is disposed on an outer circumference of at least one of the protrusions 322a of the lock housing 322.

A hook 322b is formed on the other one of the protrusions 322a of the lock housing 322, on which the lock spring 323 is not disposed, and allows the lock unit 320 to move upwardly by the lock lever 330 when an unlocking operation of the locking device 300 is performed.

That is, in an unlocking operation of the locking device 300, the lock unit 320 moves upwardly by the hook 322b formed to be hooked on an upper surface of the lock lever 330. In this case, the lower portions of the lock members 321 are taken out of the lock holes 110 of the lower rail 100, thereby performing the unlocking operation of the locking device 300.

Meanwhile, each of the lock members 321 included in the lock unit 320 may have an almost rectangular cross section including long and short sides. When the lock members 321 are inserted into the lock housing 322, the long sides of the cross sections may cross each other.

Also, each of the lock members 321 includes a pair of first side surfaces facing each other and a pair of second side surfaces facing each other. The first side surfaces are formed as perpendicular surfaces and the second side surfaces are formed as tapered and inclined surfaces.

Meanwhile, a pair of lock holes 110 are formed to correspond to a pair of lock members 321 and each of the lock holes 110 are formed as a rectangular via hole having first side edges extending in a moving direction of the upper rail 200, and second side edges extending to cross the first side edges. The lock holes 110 may have the same size and shape, or different sizes and shapes.

When the lock members 321 are inserted into the lock holes 110, the perpendicular surfaces of the one of the lock members 321 contact the second side edges of one of the lock holes 110, and the inclined surfaces of the other of the lock members 321 contact the second side edges of the other of the lock holes 110. At the same time, the inclined surfaces of the one of the lock members 321 contact the first side edges of one of the lock holes 110, and the perpendicular surface of the other of the lock members 321 contact the first side edges of the other of the lock holes 110. The configurations of the lock members 321 and the lock holes 110 will be described in detail below with reference to FIG. 6.

Figure 4:
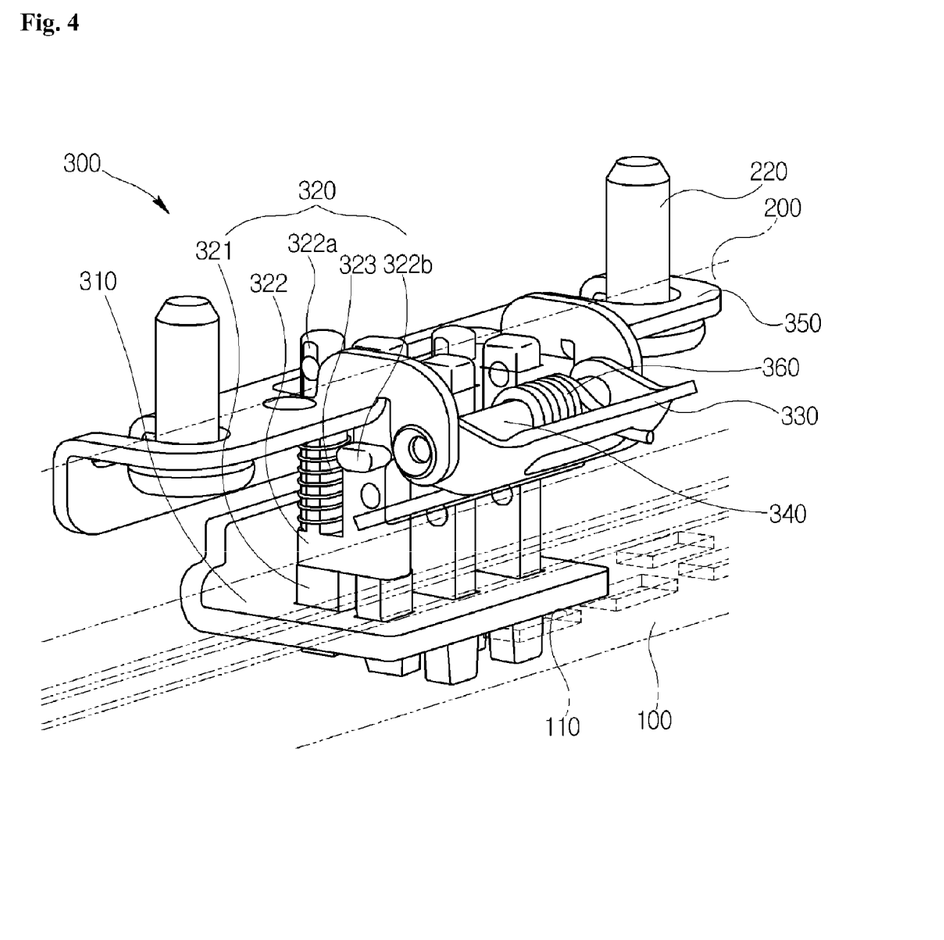
FIG. 4 is a magnified view of portions of the seat rail and the locking device illustrated in FIG. 2.
Figure 5:
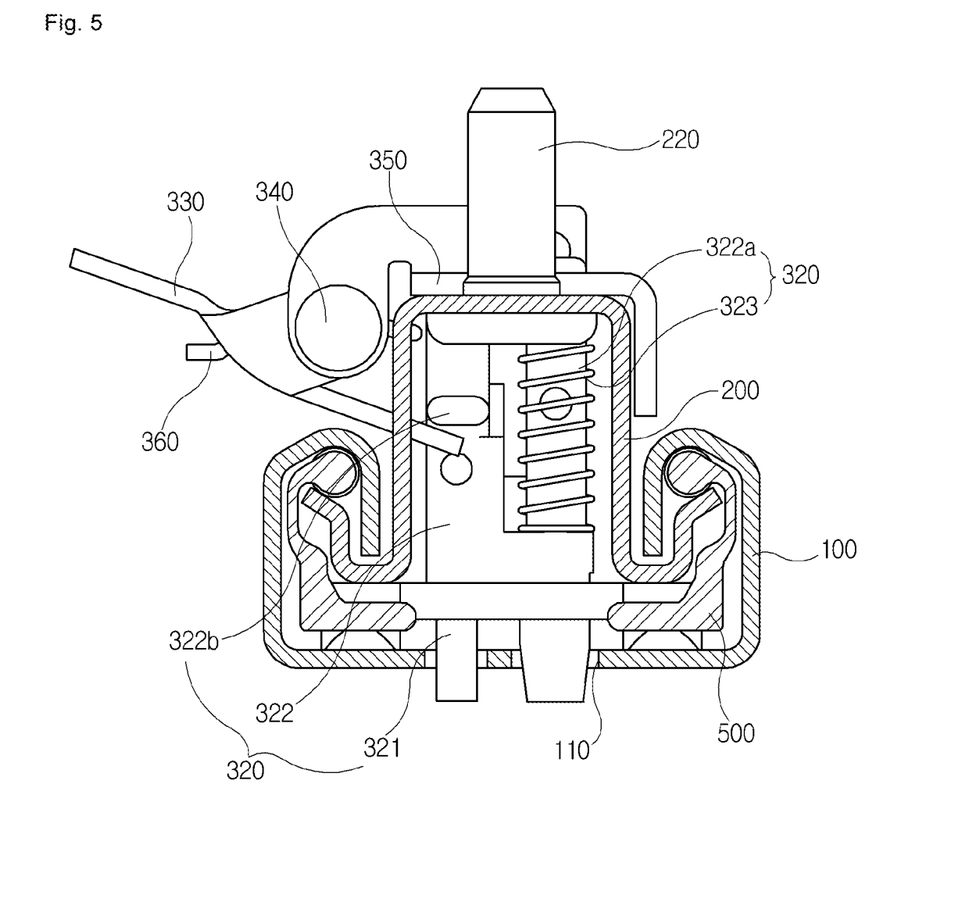
FIG. 5 is a cross-sectional view of the seat rail and the locking device illustrated in FIG. 4.

Meanwhile, the lock lever 330 includes one end that penetrates through a side of the upper rail 200 and lifts the hook 322b of the lock unit 320 between the lower and upper rails 100 and 200, and another end that protrudes outside the upper rail 200. In more detail, as illustrated in FIGS. 4 and 5, a recess 331 into which each pair of protrusions 322a formed on the lock housing 322 of the lock unit 320 are fitted is formed in the one end of the lock lever 330, and a plurality of recesses are formed to fit the protrusions 322a of a plurality of lock units 320.

That is, when the protrusions 322a of the lock housing 322 are fitted into the recess 331 of the lock lever 330, the hook 322b of the lock housing 322 contacts an upper surface of the recess 331 of the lock lever 330.

Also, fixing bumps 332 bent upwardly and used to fix the lock lever 330 to the lever guide 350 are formed at two sides of the lock lever 330, and pin guide holes 333 into which the lever pin 340 is fitted are formed in the fixing bumps 332.

The lever pin 340 is fixed between the fixing bumps 332 by fitting two ends of the lever pin 340 into the pin guide holes 333, and fixes the lock lever 330 rotatably about the lever guide 350.

Fixing holes 351 to be fixed by fixing members 220 on the upper rail 200 are formed at two sides of the lever guide 350, and a fixing recess 352 for fixing the lock lever 330 is formed at the center of the lever guide 350.

Fixing flanges 353 protruding forward and upwardly are formed at two sides of the fixing recess 352, and pin fixing holes 353a for fixing the two ends of the lever pin 340 are formed in the fixing flanges 353.

The lever spring 360 is a coil-type torsion spring fitted around the lever pin 340 and applies an elastic force in a winding or unwinding direction. One end of the lever spring 360 is supported by the lock lever 330 and another end of the lever spring 360 is supported by the upper rail 200.

Meanwhile, a retainer assembly 500 for restricting linear forward-and-backward movement of the upper rail 200 along the lower rail 100 may be further included between the lower and upper rails 100 and 200.

Operations of the locking device 300 will now be described briefly with reference to FIGS. 4 and 5.

Initially, in order to adjust the position of a seat of a vehicle appropriately for the body of a user, the user manipulates an actuation lever (not shown) to release a locked state of the locking device 300.

If the lock lever 330 rotates about the lever pin 340 by the actuation lever, the other end of the lock lever 330 protruding outside the upper rail 200 rotates downwardly by the actuation lever, and the one end of the lock lever 330 in the upper rail 200 rotates upwardly about the lever pin 340.

In this case, the rotary power of the lock lever 330 is applied to the hook 322a and thus the lock members 321 are lifted upwardly.

When the lock members 321 are lifted upwardly, the lower portions of the lock members 321 are taken out of the lock holes 110 of the lower rail 100, thereby releasing the locked state of the locking device 300.

Then, the user may adjust a forward-and-backward position of a seat by moving the seat forward or backward of the vehicle. In this case, the user has to maintain the manipulation of the actuation lever until the seat is completely moved.

After the forward-and-backward position of the seat is completely adjusted, the user stops the manipulation of the actuation lever.

The lock lever 330 that operates in connection with the actuation lever returns to its original state due to an elastic force of the lever spring 360.

In this case, the lock units 320 lifted by the lock lever 330 move downwardly due to the lock spring 323, and the lower portions of the lock members 321 are inserted into the lock holes 110 of the lower rail 100.

If the lock members 321 of the lock units 320 are inserted into the lock holes 110 of the lower rail 100, the locking device 300 is maintained in the locked state.

Figure 6:
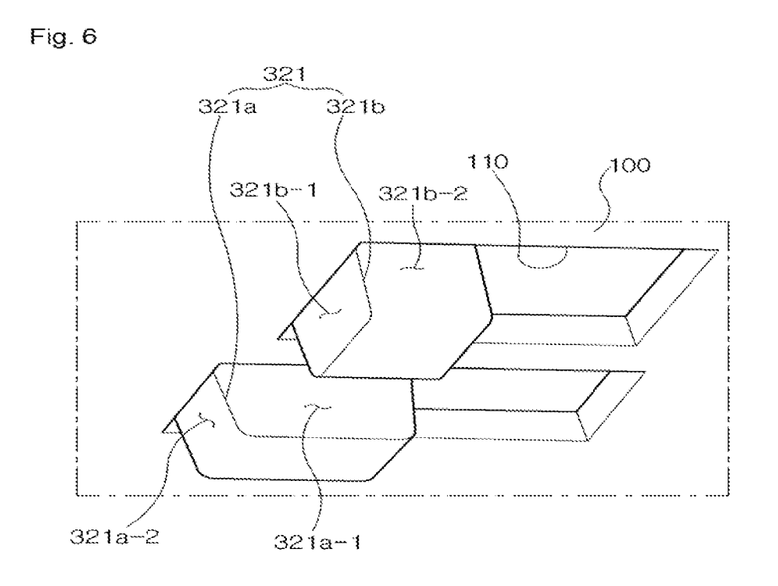
FIG. 6 is a bottom view of main portions of the seat rail and the locking device illustrated in FIG. 4.

FIG. 6 is a magnified bottom view of the lower rail 100 when a pair of lock members 321 are inserted into the lock holes 110 of the lower rail 100.

As described above, each of the lock units 320 may include a pair of lock members 321, and a pair of lock holes 110 corresponding to the lock members 321 may be formed in the lower rail 100. Correlations between the lock members 321 and the lock holes 110 will now be described on the assumption that, in FIG. 6, a lower lock member and a lower lock hole are respectively referred to as a first lock member 321*a* and a first lock hole, an upper lock member and an upper lock hole are respectively referred to as a second lock member 321*b* and a second lock hole, long and short sides of each of the first and second lock holes having a rectangular shape are respectively referred to as first and second side edges.

When the lock unit 320 is in a locked state, that is, when the lock members 321 are inserted into the lock holes 110, inclined surfaces 321*a*-2 of the first lock member 321*a* contact the second side edges of the first lock hole, and perpendicular surfaces 321*b*-1 of the second lock member 321*b* contact the second side edges of the second lock hole. At the same time, the inclined surfaces 321*b*-2 of the second lock member 321*b* contact the first side edges of the second lock hole.

In the above configuration, the lock unit 320 may compensate a longitudinal direction strength of the upper rail 200 because the perpendicular surfaces 321*b*-1 of the second lock member 321*b* contact and are supported by the second side edges of the second lock hole, may compensate a longitudinal direction clearance of the upper rail 200 because the inclined surfaces 321*a*-2 of the first lock member 321*a* contact and are supported by the second side edges of the first lock hole, and may compensate a clearance of a direction perpendicular to the longitudinal direction of the upper rail 200 because the inclined surfaces 321*b*-2 of the second lock member 321*b* contact and are supported by the first side edges of the second lock hole.

Also, in a conventional seat rail, since inclined surfaces of a plurality of lock bumps simultaneously contact lock holes, noise is generated due to minute vibration caused while the lock bumps move upwardly to release a locked state. However, according to the present invention, since each of the lock units 320 operates independently and the perpendicular surfaces 321*b*-1 of the second lock member 321*b* contact the second side edges of the second lock hole, noise may be greatly reduced.

While the present invention has been particularly shown and described with reference to exemplary embodiments thereof, it will be understood by one of ordinary skill in the art that various changes in form and details may be made therein without departing from the spirit and scope of the present invention as defined by the following claims.

The invention claimed is:

1. A seat rail of a vehicle, comprising:
a lower rail fixed to a body of the vehicle;
an upper rail combined onto the lower rail movably forward and backward in a longitudinal direction of the lower rail; and
a locking device restricting movement of the upper rail,
the locking device comprising:
a plurality of lock units moving together with the upper rail, disposed movably in a vertical direction between the lower and upper rails, and fixing the upper rail onto the lower rail, wherein each of the lock units is independently inserted into a plurality of lock holes formed as a rectangular shape in the lower rail; and
a lock guide moving together with the lock units and for guiding vertical movement of the lock units,
wherein each lock unit of the plurality of lock units comprises at least one pair of lock members passing through guide holes formed in the lock guide, and inserted into the lock holes, and the at least one pair of lock members comprises a first lock member and a second lock member,
wherein the first lock member and the second lock member respectively comprise a pair of first side surfaces opposing each other and formed as perpendicular surfaces, and a pair of second side surfaces opposing each other and formed as tapered and inclined surfaces,
wherein the lock holes comprise a first lock hole and a second lock hole, and the first lock hole and the second lock hole respectively comprise first side edges extending in the longitudinal direction and second side edges extending in a direction perpendicular to the longitudinal direction, and
wherein the first lock member and the second lock member are disposed and inserted into the lock holes in a locked state in such a way that one of the first side surfaces of the first lock member faces one of the second side surfaces of the second lock member, and that the first side surfaces of the second lock member contact the second side edges of the second lock hole, and the second side surfaces of the first lock member contact the second side edges of the first lock hole, and that the first side surfaces of the first lock member contact the first side edges of the second lock hole, and the second side surfaces of the second lock member contact the first side edges of the first lock hole.

2. The seat rail of claim 1, wherein each lock unit of the plurality of lock units comprises:
a lock housing having one end into which the lock members are inserted and fixed, and another end on which at least one pair of protrusions passing through via holes are formed in the upper rail and protruding therefrom; and
a lock spring disposed on an outer circumference of at least one of the protrusions and for pressing the lock unit downwardly.

3. The seat rail of claim 2, further comprising:
a lock lever for moving the lock units upwardly;
a lever guide fixed to the upper rail and for rotatably supporting the lock lever; and
a lever spring for applying a restoration force to the lock lever.

4. The seat rail of claim 3, wherein a hook to which the lock lever operates is formed on at least one of the protrusions.

* * * * *